United States Patent
Yamamoto et al.

(10) Patent No.: US 8,655,133 B2
(45) Date of Patent: Feb. 18, 2014

(54) OPTICAL FIBER AND OPTICAL COMMUNICATION SYSTEM INCLUDING SAME

(75) Inventors: Yoshinori Yamamoto, Yokohama (JP); Masaaki Hirano, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 354 days.

(21) Appl. No.: 13/033,101

(22) Filed: Feb. 23, 2011

(65) Prior Publication Data

US 2011/0211788 A1 Sep. 1, 2011

(30) Foreign Application Priority Data

Feb. 26, 2010 (JP) ................ P2010-042300

(51) Int. Cl.
*G02B 6/36* (2006.01)
*G02B 6/26* (2006.01)
*G02B 6/00* (2006.01)
*H04B 10/00* (2013.01)
*H04B 10/06* (2011.01)

(52) U.S. Cl.
USPC .............. 385/127; 385/24; 385/27; 385/122; 398/175; 398/178; 398/208; 398/214

(58) Field of Classification Search
USPC ........ 385/24, 27–28, 122–128; 398/173, 175, 398/178, 202, 208
See application file for complete search history.

(56) References Cited

U.S. PATENT DOCUMENTS

2001/0017967 A1* 8/2001 Hirano et al. ................. 385/123

FOREIGN PATENT DOCUMENTS

EP 1 107 027 6/2001
JP 4293156 4/2009

OTHER PUBLICATIONS

T. Kato et al., "Ultra-low nonlinearity low-loss pure silica core fibre for long-haul WDM transmission", Electronics Letters, Sep. 16, 1999, vol. 35, No. 19, pages as attached.
M. Bigot-Astruc et al., "Trench-Assisted Profiles for Large-Effective-Area Single Mode Fibers", ECOC, Sep. 2008, Mo.4.B.1, vol. 1-73, 1-74.

* cited by examiner

*Primary Examiner* — Uyen Chau N Le
*Assistant Examiner* — Michael Mooney
(74) *Attorney, Agent, or Firm* — Drinker Biddle & Reath LLP

(57) ABSTRACT

The invention relates to an optical fiber employable in an optical communication system using Raman amplification and adapted to improve OSNR and suppress bending loss at the same time, and the like. The optical fiber is a silica-based optical fiber having a depressed refractive index profile constituted by at least a core, an inner cladding having a low refractive index, and an outer cladding, an effective area $A_{eff}$ of 110 µm² or more at the wavelength of 1550 nm, and a fiber cutoff wavelength $\lambda_c$ of 1.3 µm or more but 1.53 µm or less. The depressed refractive index profile is designed such that the ratio $Ra(=2b/2a)$ of the diameter of the inner cladding to the diameter of the core is 2.5 or more but 3.5 or less and that the relative refractive index difference $\Delta^-$ of the inner cladding with respect to the outer cladding is at least the relative refractive index difference $\Delta^-_{min}$ where the bending loss at the wavelength for use is minimized but not exceeding $(\Delta^-_{min} + 0.06)$ %.

13 Claims, 9 Drawing Sheets

Fig.5

| PARAMETER | UNIT | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|---|---|---|---|---|---|---|---|---|---|
| Δ+ | % | 0.28 | 0.29 | 0.31 | 0.3 | 0.28 | 0.29 | 0.3 | 0.31 | 0.3 | 0.34 | 0.345 | 0.335 | 0.345 | 0.32 | 0.305 | 0.265 |
| Δ- | % | -0.13 | -0.08 | -0.08 | -0.06 | -0.08 | -0.08 | -0.08 | -0.12 | -0.06 | -0.12 | -0.12 | -0.08 | -0.12 | -0.12 | -0.12 | -0.08 |
| 2a | μm | 12.9 | 13.1 | 13.5 | 13.3 | 12.9 | 13.06 | 13.1 | 13.3 | 13.2 | 13.7 | 13.8 | 12 | 12.9 | 14.3 | 14.9 | 14.3 |
| 2b/2a | - | 3.5 | 3 | 3 | 3 | 3 | 3 | 3 | 3.5 | 3 | 3 | 3 | 3.4 | 3 | 2.5 | 2.5 | 3 |
| GLASS DIAMETER | μm | 125 | 125 | 125 | 125 | 125 | 125 | 125 | 125 | 125 | 125 | 125 | 125 | 125 | 125 | 125 | 125 |
| TRANSMISSION LOSS at 1550nm | dB/km | 0.320 | 0.169 | 0.162 | 0.160 | 0.166 | 0.167 | 0.165 | 0.165 | 0.162 | 0.164 | 0.171 | 0.168 | 0.170 | 0.176 | 0.182 | 0.164 |
| DISPERSION at 1550nm | ps/nm/km | 20.6 | 20.9 | 21.0 | 21.0 | 20.7 | 20.8 | 20.9 | 21.0 | 20.9 | 21.3 | 21.3 | 20.6 | 21.1 | 21.3 | 21.4 | 21.1 |
| DISPERSION SLOPE at 1550nm | ps/nm²/km | 0.0605 | 0.0600 | 0.0610 | 0.0608 | 0.0599 | 0.06 | 0.0601 | 0.0603 | 0.0602 | 0.0607 | 0.0608 | 0.0596 | 0.0602 | 0.0608 | 0.061 | 0.0606 |
| MFD at 1550nm | μm | 12.6 | 12.7 | 12.6 | 12.7 | 12.7 | 12.7 | 12.6 | 12.6 | 12.6 | 12.5 | 12.5 | 11.7 | 12.1 | 13.0 | 13.4 | 13.6 |
| $A_{eff}$ at 1550nm | μm² | 132 | 134 | 133 | 131 | 131 | 130 | 129 | 130 | 130 | 130 | 131 | 111 | 120 | 141 | 151 | 151 |
| $\lambda_c$ | nm | 1369 | 1341 | 1461 | 1473 | 1304 | 1356 | 1396 | 1460 | 1462 | 1474 | 1499 | 1399 | 1397 | 1400 | 1400 | 1392 |
| BENDING LOSS AT DIAMETER OF 20 mm at 1550nm | dB/m | 18.7 | 8.0 | 9.8 | 3.2 | 11.6 | 6.3 | 3.6 | 1.8 | 3.4 | 1.0 | 0.9 | 1.2 | 1.7 | 5.9 | 5.9 | 15.0 |
| FUNDAMENTAL-MODE CUTOFF WAVELENGTH $\lambda_{FC}$ | nm | 2263 | 2894 | 3287 | 3794 | 2807 | 2954 | 3076 | 2522 | 3766 | 2900 | 2969 | 3068 | 2775 | 2906 | 2852 | 2930 |
| WAVELENGTH $\lambda_{LK}$ WHERE LEAKAGE LOSS BEGINS | nm | 1441 | >2100 | >2100 | >2100 | >2100 | >2100 | >2100 | 1762 | >2100 | >2100 | >2100 | >2100 | 2061 | >2100 | >2100 | >2100 |

Fig.6

| | GLASS DIAMETER | PRIMARY COATING RESIN | | SECONDARY COATING RESIN | | OPTICAL FIBER CHARACTERISTIC | | MICRO-BENDING LOSS at1550nm |
|---|---|---|---|---|---|---|---|---|
| | | YOUNG'S MODULUS | OUTER DIAMETER | YOUNG'S MODULUS | OUTER DIAMETER | $A_{eff}$ at1550nm | $\lambda_c$ | |
| | μm | MPa | μm | MPa | μm | μm² | nm | dB/km |
| SAMPLE 1 | 125 | 0.66 | 200 | 800 | 245 | 116 | 1553 | 0.65 |
| SAMPLE 2 | 125 | 0.66 | 200 | 800 | 245 | 132 | 1314 | 2.01 |
| SAMPLE 3 | 125 | 0.66 | 200 | 800 | 245 | 146 | 1418 | 2.45 |
| SAMPLE 4 | 125 | 0.4 | 200 | 800 | 245 | 114 | 1433 | 0.09 |
| SAMPLE 5 | 125 | 0.4 | 200 | 800 | 245 | 134 | 1341 | 0.58 |
| SAMPLE 6 | 125 | 0.4 | 200 | 800 | 245 | 144 | 1408 | 1.11 |
| SAMPLE 7 | 125 | 0.4 | 200 | 1400 | 245 | 136 | 1411 | 0.30 |

OPTICAL FIBER AND OPTICAL COMMUNICATION SYSTEM INCLUDING SAME

BACKGROUND OF THE INVENTION

1. Field of the Invention

The present invention relates to an optical fiber which improves the optical signal-to-noise ratio (hereinafter referred to as OSNR) in a wavelength division multiplexing optical communication system using Raman amplification over a long repeater span, and an optical communication system employing such an optical fiber.

2. Related Background Art

Recently, in optical communication systems, techniques for compensating for waveform distortions resulting from dispersions by using digital signal processing (DSP) such as digital coherent receiver technology have been advancing in receivers. This has rapidly been increasing demands for improving the OSNR rather than dispersion values in optical transmission lines. For increasing the transmission rate without deteriorating the signal quality at a fixed repeater span in a communication system, the OSNR must be raised. For doubling the transmission rate, for example, it is necessary for the OSNR to be increased by twofold (by 3 dB). The OSNR must also be enhanced when increasing the repeater distance while keeping a transmission rate. For example, the OSNR must be raised by 1 dB for elongating the repeater span by 5 km.

Increasing the effective area $A_{\mathit{eff}}$ and reducing the transmission loss of an optical fiber, serving as a transmission medium, are effective in enhancing the OSNR of an optical communication system. Increasing the effective area $A_{\mathit{eff}}$ thus can fully suppress generation of nonlinear optical phenomena even when signal light having a high power propagates through the optical fiber. Optical fibers with the increased effective area $A_{\mathit{eff}}$ can accept greater incident signal light power. As the incident signal light power is greater, the receiving signal light power becomes higher, whereby the OSNR can be enhanced.

When the transmission loss is lower, a greater signal light power can be received on the receiving side even when the incident signal light power is the same. This can also enhance the OSNR.

Japanese Patent No. 4293156 (Document 1) discloses an optical fiber having an effective area $A_{\mathit{eff}}$ of 110 μm² or more and a transmission loss of 0.180 dB/km or less. This optical fiber has a depressed cladding type refractive index profile and is constituted by a core, an inner cladding, and an outer cladding sequentially from the optical axis center. In the optical fiber, the core diameter 2a is 11.5 to 23.0 μm, the diameter ratio of the inner cladding to the core 2b/2a is 1.1 to 7, the relative refractive index difference $\Delta^+$ of the core with respect to the outer cladding is 0.15% to 0.30%, and the relative refractive index difference $\Delta^-$ of the inner cladding with respect to the outer cladding is −0.15% to −0.01%.

M. Bigot-Astruc et al., "Trench-Assisted Profiles for Large-Effective-Area Single Mode Fibers", Mo.4.B.1, ECOC2008 (Document 2) discloses an optical fiber having an effective $A_{\mathit{eff}}$ of 120 μm² and a transmission loss of 0.183 dB/km. This optical fiber has a trench type refractive index profile.

SUMMARY OF THE INVENTION

The present inventors have examined the above prior art, and as a result, have discovered the following problems. In actual optical communication systems, both ends of a transmission optical fiber are connected to devices such as repeaters and transmitters/receivers. Both ends of the devices are constituted by optical fibers such as universal single-mode fibers (hereinafter referred to as SMF) or non-zero dispersion-shifted optical fibers (hereinafter referred to as NZDSF). Such optical fibers are connected to the transmission optical fiber by fusion splicing, connector, and the like. There are also cases where, in the middle of the transmission line, the transmission optical fiber is connected to other transmission optical fibers of different kinds. When the effective area $A_{\mathit{eff}}$ of the transmission optical fiber is much larger than that of optical fibers at both ends of the devices or the other transmission optical fibers, the splice loss becomes greater, thereby deteriorating the OSNR of the optical communication system as a whole.

While distributed Raman amplification is often employed in long haul optical communication systems, the Raman amplification efficiency decreases when the effective area $A_{\mathit{eff}}$ of the transmission optical fiber is greater. Therefore, an enormous pump light power is necessary for attaining a desirable gain. In view of the foregoing, the effective area $A_{\mathit{eff}}$ of the transmission optical fiber must be set to an appropriate value instead of being made as large as possible. The above-mentioned prior art fails to report any optical fiber whose effective area $A_{\mathit{eff}}$ is optimized such as to be able to improve the OSNR while taking account of the splice loss.

In general, enhancing the effective area $A_{\mathit{eff}}$ in an optical fiber increases its bending loss. While the optical fiber disclosed in the above-mentioned Document 1 employs a depressed cladding type refractive index profile in order to suppress the bending loss, the profile must be designed carefully such that no leakage loss is caused by fundamental-mode cutoff. The above-mentioned Document 1 describes that "no fundamental-mode light propagates through the optical fiber when the relative refractive index difference $\Delta^+$ of the core and relative refractive index difference $\Delta^-$ of the inner cladding with respect to the outer cladding have the same absolute value" (see paragraph [0047] in the above-mentioned Document 1). However, this just keeps the fundamental-mode cutoff from occurring at the wavelength for use. In practice, the fundamental-mode propagation light begins to leak at a wavelength shorter than the fundamental-mode cutoff wavelength, thereby increasing the transmission loss. The leakage loss caused by the fundamental-mode cutoff must be suppressed in the whole wavelength band for use (1530 nm to 1625 nm).

The present invention has been developed to eliminate the problems described above. It is an object of the present invention to provide an optical communication system which uses Raman amplification while having a structure for connecting with devices and other kinds of optical fibers, and an optical fiber employable therein. In particular, the aimed optical fiber is one having a structure for making it possible to improve the OSNR and a depressed cladding type refractive index profile and can suppress the bending loss while preventing the leakage loss from being caused by the fundamental-mode cutoff. The optical communication system as a whole employs a technique, such as digital coherent receiver technology, by which a receiver compensates for waveform distortions caused by dispersions, thereby making it unnecessary to consider any improvement for the dispersion value of the optical fiber.

The optical fiber according to the present invention is a silica-based optical fiber having, as optical characteristics, a transmission loss of 0.19 dB/km or less at a wavelength of 1550 nm, an effective area $A_{\mathit{eff}}$ of 110 μm² or more at the wavelength of 1550 nm, and a fiber cutoff wavelength $\lambda_C$ of 1.3 µm or more but 1.53 µm or less. For accomplishing the depressed cladding type refractive index profile, the optical fiber comprises a core comprised of pure silica having a refractive index $n_1$ and a diameter $2a$; an inner cladding, disposed at an outer periphery of the core, having a refractive index $n_2$ and a diameter $2b$; and an outer cladding, disposed at an outer periphery of the inner cladding, having a refractive index $n_3$.

Preferably, in the optical fiber according to the present invention, the refractive index $n_3$ satisfies $n_1 > n_3 > n_2$ (condition 1). Preferably, the relative refractive index difference $\Delta^- (=100 \times (n_2 - n_3)/n_3)$ of the inner cladding with respect to the outer cladding satisfies $-0.12\% \leq \Delta^- \leq -0.06\%$ (condition 2). Preferably, the ratio Ra ($=2b/2a$) of the diameter of the inner cladding to the diameter of the core satisfies $2.5 \leq Ra \leq 3.5$ (condition 3).

The optical fiber according to the present invention can be employed in media for propagating light having a wavelength of 1625 nm or less. The optical fiber has a pure silica core with a low loss and a depressed cladding type refractive index profile which is resistant to the bending loss. The optical fiber succeeds in reducing the leakage loss by setting the fundamental-mode cutoff wavelength $\lambda_{FC}$ to 2400 nm or more.

While having the above-mentioned optical characteristic and depressed cladding type refractive index profile, the optical fiber according to the present invention may satisfy the following two conditions in addition to the above-mentioned conditions 1 and 3. One of the two conditions is that, letting $\lambda_{FCup}$ be the fundamental-mode cutoff wavelength when the fundamental mode starts leaking at the upper limit of wavelength for use, the fundamental-mode cutoff wavelength $\lambda_{FC}$ is set to a wavelength exceeding $\lambda_{FCup}$ (condition 4). The other is that, letting $A^-_{min}$ be the relative refractive index difference $\Delta^- (=100 \times (n_2 - n_3)/n_3)$ of the inner cladding with respect to the outer cladding at which the bending loss at the wavelength for use is minimized, $\Delta^-$ is designed such as to become $\Delta^-_{min}$ or more but $(\Delta^-_{min} + 0.06)$ % or less (condition 5).

For enabling transmission up to 1625 nm as the upper-limit wavelength, the effective area $A_{eff}$ at the wavelength of 1550 nm may be 150 µm² or less. At least two locations are expected to be spliced in a repeater span in an optical communication system in which the optical fiber is employed, while Raman amplification is expected to be used in this repeater span, whereby an OSNR improvement of 1 dB or higher is secured in the optical communication system as a whole. For securing higher OSNR, the effective area $A_{eff}$ at the wavelength of 1550 nm may be 120 µm² or more but 140 µm² or less.

The optical communication system according to the present invention includes an optical fiber (the optical fiber according to the present invention) having the structure mentioned above. The optical communication system Raman-amplifies propagating light within the optical fiber. In this case, in order for pumping light for Raman amplification to propagate in a single mode, the optical fiber preferably has a fiber cutoff wavelength of 1.45 µm or less.

The optical communication system according to the present invention can construct an optical communication system having a repeater span of 80 km or more (a long repeater span) by using a plurality of first optical fibers and a plurality of second optical fibers. In this case, a plurality of first optical fibers are disposed at two or more locations in the repeater span of 80 km or more. A plurality of second optical fibers are connected to the first optical fibers at four or more locations in the repeater span. Each of the plurality of second optical fibers has an effective area $A_{eff}$ of 85 µm² or less at the wavelength of 1550 nm. The plurality of second optical fibers include at least those disposed at both ends of the repeater span and at one location in the repeater span. That is, in the optical communication system, the first optical fibers are assumed to connect with the second optical fibers having a small effective area $A_{eff}$ of 85 µm² or less at four or more locations, while the first optical fibers have a large effective area $A_{eff}$ of 110 µm² to 150 µm², thereby making it possible to input Raman amplification pumping light having a higher power. On the other hand, the first optical fibers have a low transmission loss of 0.19 dB/km or less at the wavelength of 1550 nm, thereby enabling optical transmission in the long repeater span. As a result, an OSNR improvement of 1 dB or higher can be attained in the optical communication system as a whole.

Preferably, each of the first optical fibers has a transmission loss of 0.19 dB/km or less at the wavelength of 1550 nm, an effective area $A_{eff}$ of 110 µm² or more but 150 µm² or less at the wavelength of 1550 nm, and a fiber cutoff wavelength $\lambda_C$ of 1.3 µm or more but 1.45 µm or less. In this case, the optical communication system Raman-amplifies the propagating light in each of the first optical fibers.

For accomplishing the depressed cladding type refractive index profile, each of the first optical fibers may comprise a core comprised of pure silica having a refractive index $n_1$ and a diameter $2a$; an inner cladding, disposed at an outer periphery of the core, having a refractive index $n_2$ and a diameter $2b$; and an outer cladding, disposed at an outer periphery of the inner cladding, having a refractive index $n_3$. Preferably, the refractive index $n_3$ satisfies the above-mentioned condition 1. Preferably, the ratio Ra of the diameter of the inner cladding to the diameter of the core satisfies the above-mentioned condition 3. Preferably, each of the first optical fibers satisfies both of the above-mentioned conditions 4 and 5.

Preferably, each of the first optical fibers employed in the optical communication system according to the present invention is a medium for propagating light having a wavelength of 1625 nm or less, has the above-mentioned depressed cladding type refractive index profile, and satisfies the above-mentioned conditions 1, 2, and 3. Preferably, in this case, the effective area $A_{eff}$ of each of the first optical fibers is 120 µm² or more but 140 µm² or less.

BRIEF DESCRIPTION OF THE DRAWINGS

FIG. 5 is a table listing structural parameters and optical characteristics of optical fibers (Examples 1 to 15) according to the embodiment and an optical fiber according to a comparative example;

FIG. 6 is a table listing micro-bending loss in a plurality of samples of the optical fiber according to the present embodiment obtained when changing the Young's modulus of coating resins and the effective area $A_{eff}$;

DESCRIPTION OF THE PREFERRED EMBODIMENTS

Figure 1:
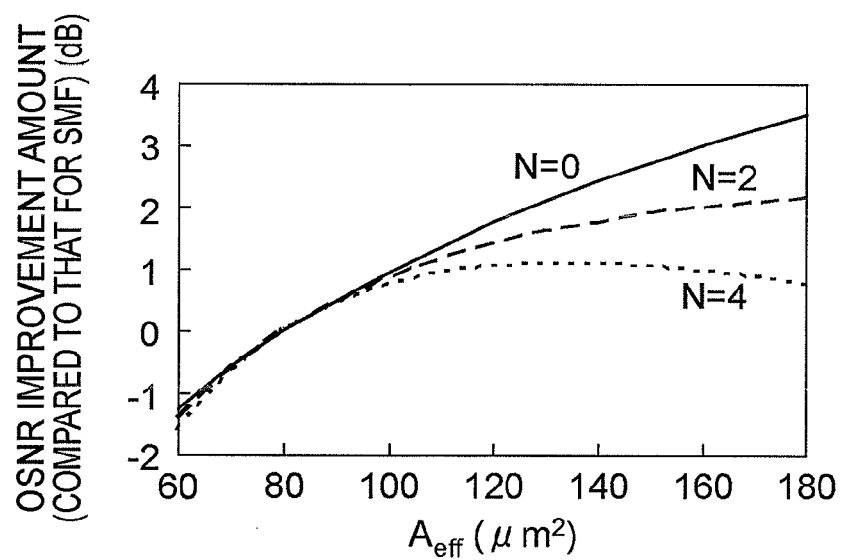
FIG. 1 is a graph showing the relationship between the effective area $A_{eff}$ and the amount of improvement in OSNR.

In the following, embodiments of the optical fiber and optical communication system according to the present invention will be explained in detail with reference to FIGS. 1, 2A, 2B, 3 to 6, 7A to 7C, 8, 9A, and 9B. In the description of the drawings, identical or corresponding components are designated by the same reference numerals, and overlapping description is omitted.

First, an optimal value of the effective area $A_{eff}$ of the optical fiber according to the present embodiment, which is employable in a transmission optical fiber of an optical communication system, will be explained. From the viewpoint of characteristics of the optical fiber, the OSNR is approximately represented by the following expression (1):

$$\mathrm{OSNR(dB)} \propto 10\log(A\mathrm{eff} \times \alpha(1/\mathrm{km})) - \alpha_{sp}(\mathrm{dB}) \times N - \alpha(\mathrm{dB/km}) \times L(\mathrm{km}) \quad (1)$$

where $A_{eff}$ is the effective area of the optical fiber at a signal light wavelength, $\alpha$ is the transmission loss at the signal light wavelength, $\alpha_{sp}$ is the splice loss, N is the number of connections per repeater span, and L is the length of optical fiber per repeater span.

The first term of the above-mentioned expression (1) corresponds to the permissible incident light power when the nonlinear phase shift amount caused by self-phase modulation, which is one of nonlinear optical phenomena occurring in the optical fiber, is assumed to be constant. The nonlinear phase shift amount $\phi_{SPM}$ is given by the following expression (2):

$$\phi_{SPM} = \frac{2\pi}{\lambda} \frac{n_2}{A_{eff}} \cdot L_{eff} \cdot P_{in} \quad (2)$$

where $\lambda$ is the signal light wavelength, $n_2$ is the nonlinear refractive index of the optical fiber, $L_{eff}$ is the effective length of the optical fiber, and $P_{in}$ is the incident light power.

The effective length $L_{eff}$ can be approximated as $L_{eff} \approx 1/\alpha$ (1/km) when the fiber length is sufficiently long which is 50 km or more, for example. As the above-mentioned expression (2) indicates, the permissible incident light power increases in proportion to $A_{eff}(\mu m^2) \times \alpha(1/km)$ when the nonlinear refractive index $n_2$ and nonlinear phase shift amount $\phi_{SPM}$ are constant.

The second term in the above-mentioned expression (1) corresponds to the splice loss of the optical fiber. When only the mismatching of the mode field diameter (hereinafter referred to as MFD) between two kinds of optical fibers connected to each other is taken into consideration, the splice loss (dB) can be estimated by the following expression (3):

$$\alpha_{sp}(\mathrm{dB}) = 10\log\left[\left(\frac{2W_1 W_2}{W_1^2 + W_2^2}\right)^2\right] \quad (3)$$

where $W_1$ is the MFD of the optical fiber according to the present embodiment, and $W_2$ is the MFD of the optical fibers at both ends of the device or other transmission optical fibers.

Examples of the other kinds of transmission optical fibers include single-mode fibers (SMF) having an $A_{eff}$ of 80 $\mu m^2$ and MFD of 10.1 $\mu m$ and dispersion-shifted fibers (DSF) and non-zero dispersion shifted fibers (NZDSF) having an $A_{eff}$ of 50 to 70 $\mu m^2$ and MFD of 8 to 10 $\mu m$ each at the wavelength of 1550 nm. As the second term of the above-mentioned expression (1) indicates, both the MFD mismatching and splice loss increase when the $A_{eff}$ is greater than that of the optical fibers at both ends of the device or other transmission optical fibers. The third term of the above-mentioned expression (1) indicates the transmission loss of the optical fiber. In the following, the wavelength-dependent characteristics are assumed to be those at the wavelength of 1550 nm unless wavelengths are specified.

FIG. 1 is a graph showing the relationship between the effective area $A_{eff}$ and the amount of improvement in OSNR. FIG. 1 represents OSNR curves of respective spliced structures where the number of connections in a single repeater span is 0, 2, and 4. In FIG. 1, the ordinate indicates the amount of improvement in OSNR compared to that for SMF (having an $A_{eff}$ of 80 $\mu m^2$ and a transmission loss of 0.190 dB/km) as a transmission fiber. For evaluating the influence of the effective area $A_{eff}$ upon the OSNR improvement amount, the transmission loss is identical to that of the SMF in all the cases. $W_2$ in the above-mentioned expression (3) is the MFD of the SMF, which is specifically 10.1 $\mu m$.

FIG. 1 shows that, when there is no connection (N=0), the OSNR can be improved more as the effective area $A_{eff}$ is greater. The case where two connections exist at both ends of one repeater span (N=2) corresponds to a state in which optical fibers in devices such as repeaters are connected both ends of the transmission fiber (see FIG. 9A). In this case, the OSNR improving amount is substantially saturated when the effective area $A_{eff}$ is 150 $\mu m^2$ or more. Therefore, the effect of improving OSNR becomes smaller when the effective area $A_{eff}$ is increased further. For keeping the pumping light power for distributed Raman amplification within a practical range (several watts or less), the effective area $A_{eff}$ is required to be 150 $\mu m^2$ or less. Hence, for attaining an OSNR improvement amount of 1 dB or more, it will be favorable if the effective area $A_{eff}$ falls within the range of 110 to 150 $\mu m^2$. The case where four connections exist in one repeater span (N=4) corresponds to a state in which two connections between the transmission optical fiber and other kinds of transmission fibers further exist in the middle of the repeater span (see FIG. 9B). In this case, the OSNR improvement amount is maximized when the effective area $A_{eff}$ is 135 $\mu m^2$. The OSNR improvement amount becomes 1 dB or more when the effective area $A_{eff}$ falls within the range of 110 to 150 $\mu m^2$. This is a range within which the pumping light power for Raman amplification is practical.

Figure 2A:
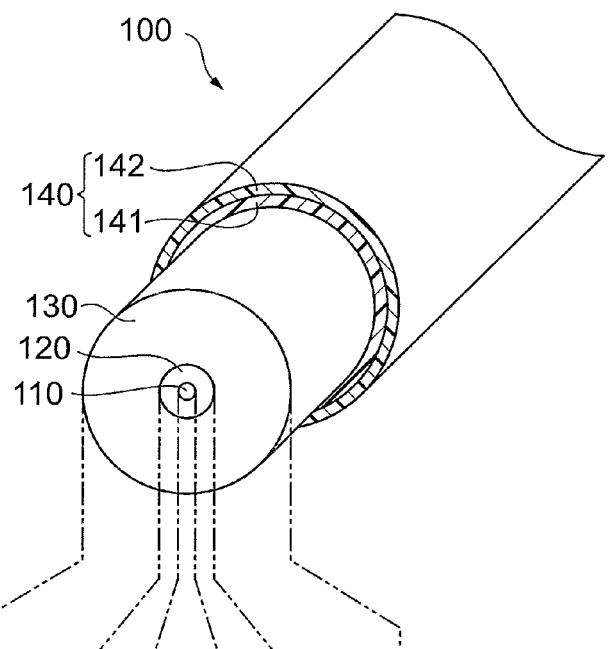
FIGS. 2A and 2B are a view showing a cross-sectional structure of one embodiment of the optical fiber according to the present invention and a refractive index profile thereof, respectively.
Figure 2B:
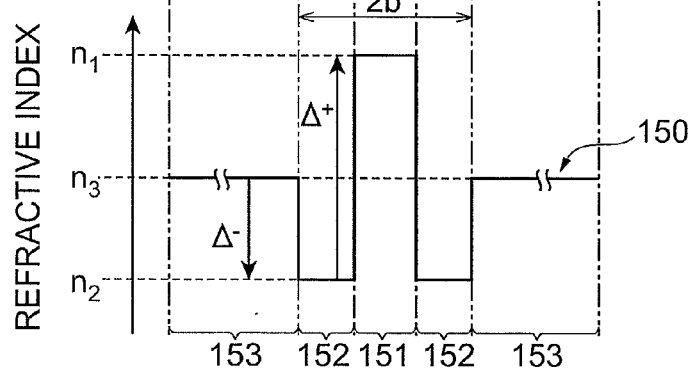

FIGS. 2A and 2B are a view showing a cross-sectional structure of one embodiment of the optical fiber according to the present invention and a refractive index profile thereof, respectively. As shown in FIG. 2A, the optical fiber 100 according to the present embodiment comprises a core 110 extending along a predetermined axis and having a refractive index $n_1$ and a diameter $2a$; an inner cladding 120, disposed at the outer periphery of the core 110, having a refractive index $n_2$ (<$n_1$) and a diameter $2b$; an outer cladding 130, disposed at the outer periphery of the inner cladding 120, having a refractive index $n_3$ (<$n_1$, >$n_2$); and a coating resin 140 disposed at the outer periphery of the outer cladding 130. The coating resin 140 is constituted by a primary coating resin 141 disposed at the outer periphery of the outer cladding 140 and a secondary coating resin 142 disposed at the outer periphery of the primary coating resin 141.

FIG. 2B shows a refractive index profile 150 of the glass region in the optical fiber 100 shown in FIG. 2A. In the refractive index profile 150, regions 151, 152, 153 indicate the respective refractive indexes of the core 110, inner cladding 120, and outer cladding 130.

As a characteristic feature of such refractive index profile 150, an optical fiber having the refractive index profile 150 can exhibit a lower bending loss than an optical fiber having a step-index type refractive index profile when they have the same effective area $A_{eff}$. However, the optical fiber having the refractive index profile 150 has been known to start leaking the fundamental-mode light when the wavelength becomes longer and cause fundamental-mode cutoff at a certain wavelength. The optical fiber having the step-index type refractive index profile has no fundamental-mode cutoff but yields a large bending loss.

Figure 3:
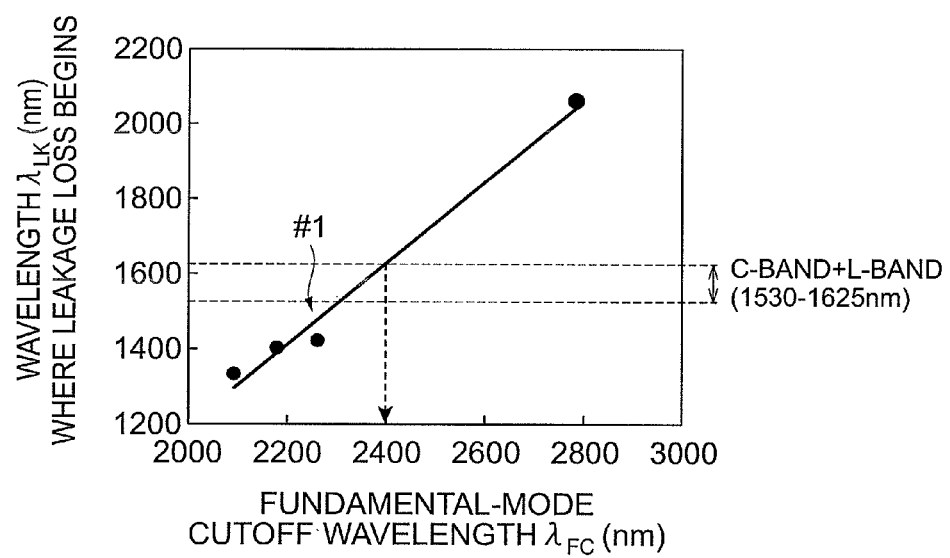
FIG. 3 is a graph showing the relationship between the wavelength at which leakage loss begins to occur and the fundamental-mode cutoff wavelength.

FIG. 3 is a graph showing the relationship between the wavelength $\lambda_{LK}$(nm) at which leakage loss begins to occur and the fundamental-mode cutoff wavelength $\lambda_{FC}$ (nm). Here, the wavelength $\lambda_{LK}$ is defined as a wavelength at which the fundamental-mode leakage loss is 20% or more of the transmission loss in an optical fiber having a step-index type refractive index profile and a center core substantially comprised of pure silica. For preventing the leakage loss in all the wavelength bands of C band to L band (1530 to 1625 nm, i.e., the wavelength band for use in the optical communication system according to the present embodiment) (so as to set the wavelength $\lambda_{LK}$ to 1625 nm or more), the fundamental-mode cutoff wavelength $\lambda_{FC}$ is required to be 2400 nm or more as can be seen from FIG. 3. In FIG. 3, "#1" represents the comparative example listed in Table 1 of FIG. 5 which will be explained later.

Figure 4:
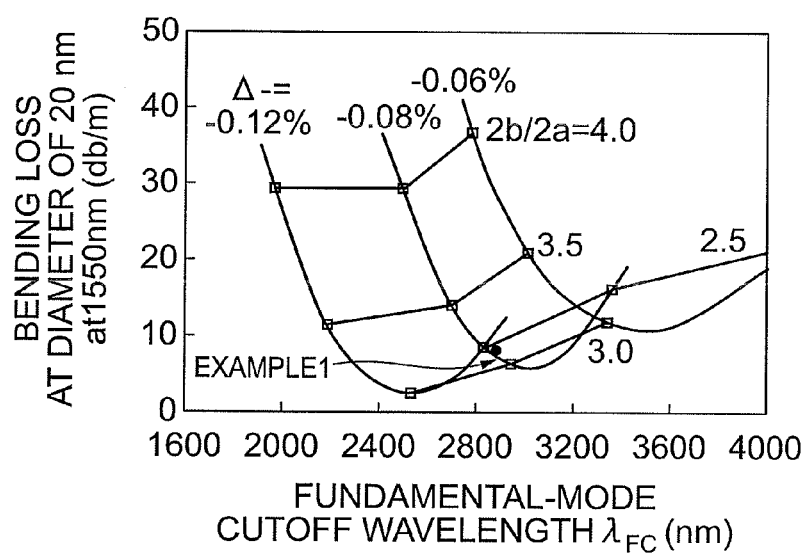
FIG. 4 is a graph showing the relationship between the bending loss at a diameter of 20 mm and the fundamental-mode cutoff wavelength.

FIG. 4 is a graph showing the relationship between the bending loss at a diameter of 20 mm and the fundamental-mode cutoff wavelength. Specifically, it shows the relationship between the fundamental-mode cutoff wavelength $\lambda_{FC}$ (nm) and the bending loss at the diameter of 20 mm obtained when changing the relative refractive index difference $\Delta^-$ of the inner cladding 120 with respect to the outer cladding 130 and the ratio ($2b/2a$) of the diameter of the inner cladding 120 to the diameter of the core 110. In FIG. 4, the relative refractive index difference $\Delta^+$ of the core 110 with respect to the inner cladding 120 and the diameter $2a$ of the core 110 are adjusted such that the effective area $A_{eff}$ and the LP11-mode cutoff wavelength $\lambda_C$ become 135 $\mu m^2$ and 1350 nm, respectively.

In the Raman amplification, the fiber cutoff wavelength is preferably 1.45 $\mu m$ or less for achieving the single mode even at a pumping light wavelength. The bending loss is minimized when the ratio $2b/2a$ is 3.0. For suppressing the bending loss to 20 dB or less, i.e., on a par with or less than that of the SMF, the ratio $2b/2a$ and the relative refractive index difference $\Delta^-$ are required to be 2.5 to 3.5 and −0.06% or less, respectively. For the fundamental-mode cutoff wavelength $\lambda_{FC}$ to become 2400 nm or more, the relative refractive index difference $\Delta^-$ is required to be −0.12% or more when the ratio $2b/2a$ is 3.0.

FIG. 5 is a table listing structural parameters and optical characteristics of optical fibers (Examples 1 to 15) according to the present embodiment and an optical fiber according to a comparative example. In the comparative example listed in the table of FIG. 5, while the fundamental-mode cutoff wavelength $\lambda_{FC}$ is 2263 nm which is longer than the signal light wavelength, the leakage loss begins to occur at 1441 nm (=$\lambda_{LK}$), and the transmission loss at the wavelength of 1550 nm is 0.32 dB/km which is high. On the other hand, Examples 1 to 15 generate no leakage loss in the optical communication wavelength band. In Example 1, the effective area $A_{eff}$ and bending loss are 134 $\mu m^2$ and 8.0 dB/m, respectively, which are favorable. The remaining Examples 2 to 15 also have bending loss better than that of the comparative example.

Increasing the effective area $A_{eff}$ enhances the micro-bending loss. FIG. 6 is a table listing micro-bending loss in a plurality of samples of the optical fiber according to the present embodiment obtained when changing the Young's modulus of coating resins and the effective area $A_{eff}$. FIG. 6 lists the micro-bending loss with respect to the glass diameter (the diameter of the outer cladding 130), the Young's modulus and diameter of the primary coating resin 141, the Young's modulus and diameter of the secondary coating resin 142, and $A_{eff}$ and $\lambda_C$ of each optical fiber. Here, the micro-bending loss is represented by the amount of increase in loss when the optical fiber is wound by a tension of 80 g on a bobbin having a diameter of 400 mm whose surface is covered with a mesh of wires having a diameter of 50 $\mu m$ and intervals of 100 $\mu m$.

When samples 1 to 3 are compared with samples 4 to 6 in FIG. 6, it is seen that the optical fibers of samples 4 to 6 can reduce the micro-bending loss more by lowering the Young's modulus of the primary coating resin 141 when the effective area $A_{eff}$ is the same. When the samples 5 and 7 are compared with each other, it is seen that the optical fiber of sample 7 can reduce the micro-bending loss more by increasing the Young's modulus of the secondary coating resin 142 when the effective area $A_{eff}$ is the same.

In general, the micro-bending loss decreases as the Young's modulus is lower in the primary coating resin 141 and higher in the secondary coating resin 142, in the optical fiber. Specifically, it will be preferred if the Young's modulus is selected within the ranges of 0.3 to 0.6 MPa and 700 to 1500 MPa in the primary coating resin 141 and secondary coating resin 142, respectively.

Enhancing the glass diameter or the diameter of the coating resin 140 (including the primary coating resin 141 and secondary coating resin 142) as means for reducing the micro-bending loss is unpractical, since it increases the difference from optical fibers (having a glass diameter of 125 $\mu m$ and a coating diameter of 245 $\mu m$) used in general. Therefore, the glass diameter and the diameter of the secondary coating resin 142 are assumed to be 125±1 $\mu m$ and 240 to 250 $\mu m$, respectively, in the optical fiber according to the present embodiment.

Figure 7A:
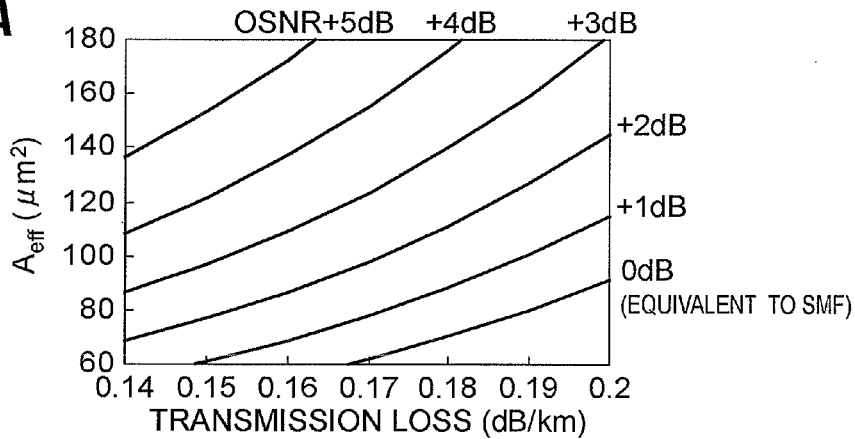
FIGS. 7A to 7C are graphs showing, in terms of the relationship between the effective area $A_{eff}$ and transmission loss, the amount of improvement in OSNR over a single-mode fiber (SMF) caused by differences in splicing states in a repeater span.
Figure 7B:
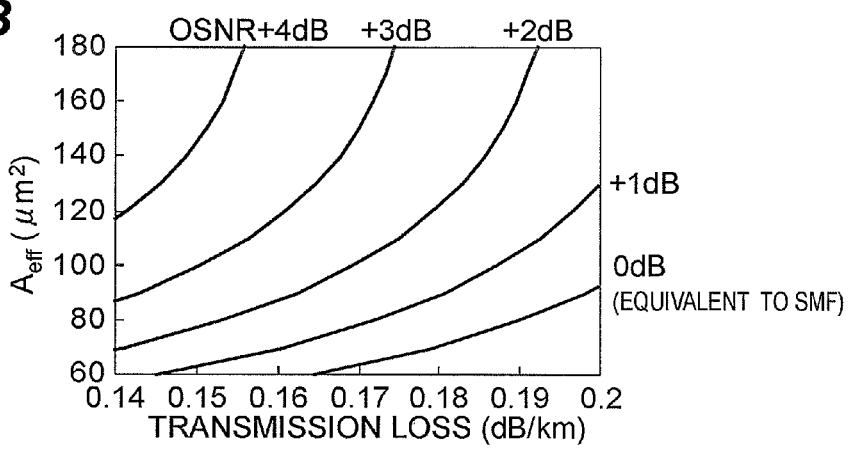
Figure 7C:
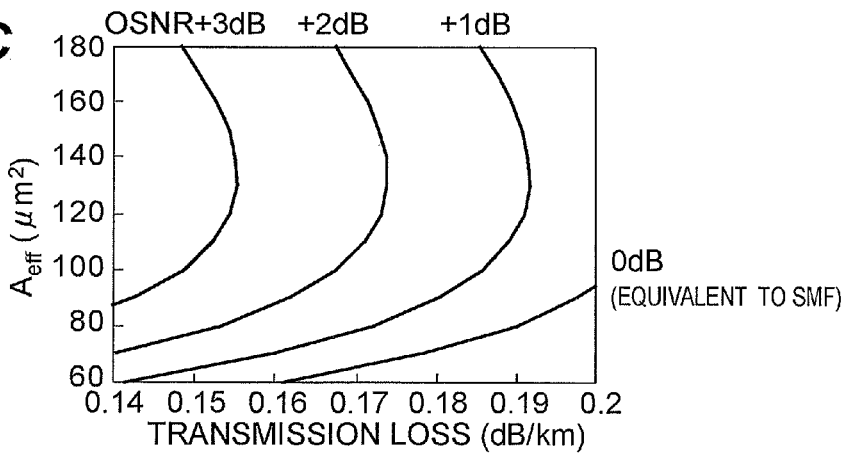

FIGS. 7A to 7C are graphs showing, in terms of the relationship between the effective area $A_{eff}$ and transmission loss, the amount of improvement in OSNR compared to a single-mode fiber (SMF) caused by differences in splicing states in a repeater span. In particular, FIG. 7A shows the OSNR improvement amount with respect to the SMF in terms of the relationship between the effective area $A_{eff}$ ($\mu m^2$) and transmission loss (dB/km) in a repeater span structure of 80 km constructed by a transmission optical fiber having no connection with the SMF, FIG. 7B shows the OSNR improvement amount with respect to the SMF in terms of the relationship between the effective area $A_{eff}$ ($\mu m^2$) and transmission loss (dB/km) in a repeater span structure of 80 km including a transmission optical fiber connected to the SMF at two locations, and FIG. 7C shows the OSNR improvement amount with respect to the SMF in terms of the relationship between the effective area $A_{eff}$ (µm²) and transmission loss (dB/km) in a repeater span structure of 80 km including a transmission optical fiber connected to the SMF at four locations.

As described above, FIGS. 7A to 7C are graphs showing, as contour lines with respect to the effective area $A_{eff}$ and transmission loss, the OSNR improvement amounts in the respective cases where the number of connections between the transmission optical fiber according to the present embodiment and the SMF is 0, 2, and 4. The length of one repeater span is 80 km, while the MFD of the SMF as $W_2$ in the above-mentioned expression (3) is 10.1 µm. The OSNR improvement amount is normalized to the case where the SMF is used as the transmission fiber.

FIGS. 7A to 7C show that the OSNR improvement amount can become 1 dB or higher when the number of connections in one repeater span is 0 to 4 if the effective area $A_{eff}$ and transmission loss are 110 to 150 µm² and 0.19 dB/km or less, respectively. The OSNR improvement amount can become 2 dB or higher when the number of connections in one repeater span is 0 or 2 if the effective area $A_{eff}$ and transmission loss are 120 to 140 µm² and 0.18 dB/km or less, respectively. The OSNR improvement amount can become 2 dB or higher even when the number of connections in one repeater span is 4 if the effective area $A_{eff}$ and transmission loss are 120 to 140 µm² and 0.17 dB/km or less, respectively.

Preferably, the fiber cutoff wavelength $\lambda_C$ falls within the range of 1.3 to 1.53 µm. Below this range, the bending loss becomes greater. Above this range, on the other hand, the signal light fails to attain the single mode in C band (1530 to 1565 nm). More preferably, the fiber cutoff wavelength $\lambda_C$ is 1450 nm or less. This is because the pumping light used for distributed Raman amplification has a wavelength of about 1450 nm and thus attains the single mode, whereby the pumping efficiency does not deteriorate.

More preferably, in the optical fiber 100 according to the present embodiment, the core 110 through which the signal light power mostly propagates is comprised of pure silica containing substantially no impurities, since it can lower the transmission loss. The core 110 may also contain a minute amount of additives to such an extent that the transmission loss is not increased thereby. For example, the core 110 may contain minute amounts of halogen elements and alkali metal elements. Specifically, the core 110 may contain 2 mol % or less of chlorine Cl, 1 mol % or less of fluorine F, and 0.1 mol % or less of potassium K.

The optical fiber having the pure silica core has a low nonlinear refractive index $n_2$ and thus can increase the permissible incident power when the phase shift amount ($\phi_{SPM}$ is held constant. Therefore, the OSNR can further be increased. While the nonlinear refractive index $n_2$ of the SMF having the core 110 doped with Ge is $2.35 \times 10^{-20}$ (m²/W), the nonlinear refractive index $n_2$ of an optical fiber having a pure silica core is $2.20 \times 10^{-20}$ (m²/W).

Figure 8:
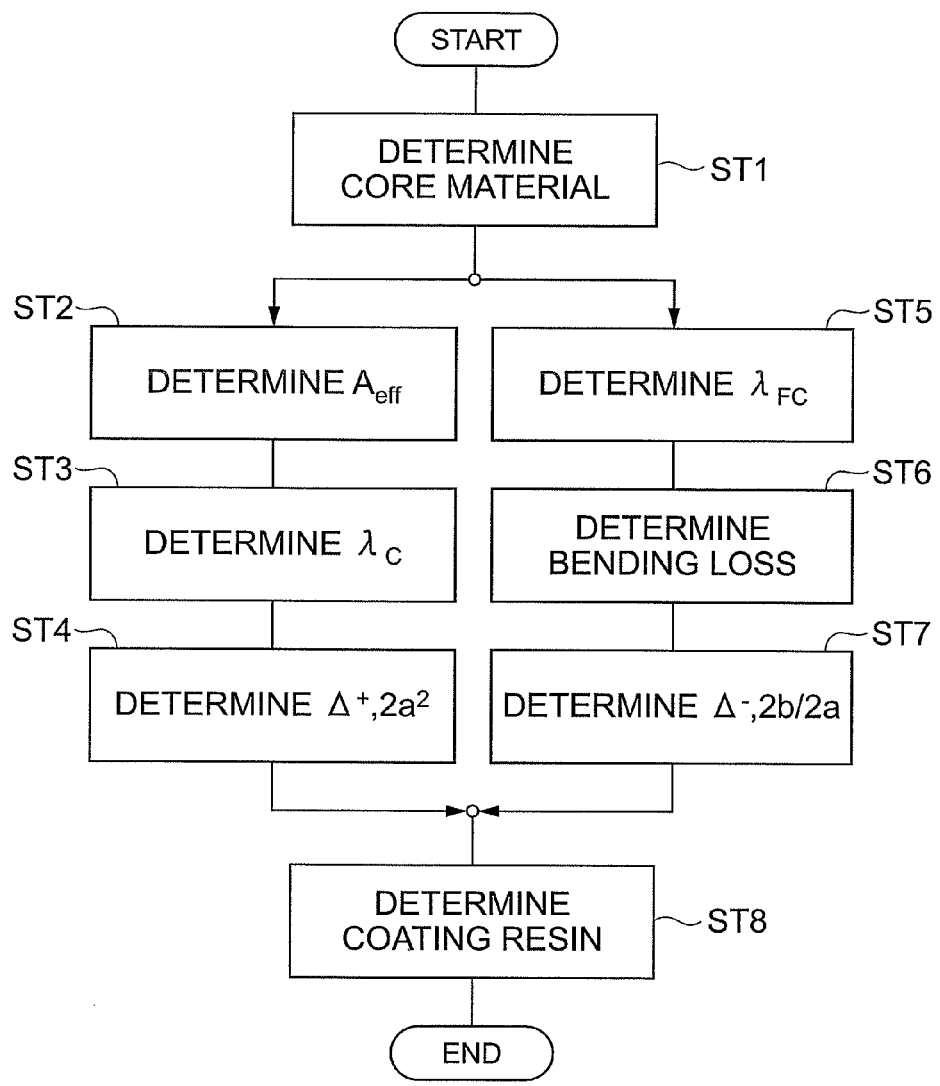
FIG. 8 is a flowchart for explaining actions for determining the structure of the optical fiber according to the present embodiment.

Actions for determining the structure of the optical fiber according to the present embodiment will now be explained in detail with reference to FIG. 8. FIG. 8 is a flowchart for explaining the actions for determining the structure of the optical fiber according to the present embodiment.

First, when determining the structure of the optical fiber 100, a material for the core 110 is determined (step ST1). A substantially pure silica core is more desirable. Preferably, the inner cladding 120 and outer cladding 130 are doped with fluorine (since the pure silica core exhibits a low transmission loss reduction and a low nonlinear refractive index $n_2$).

At step ST2, a desirable effective area $A_{eff}$ for improving the OSNR is determined from the above-mentioned expressions (1) and (2). At step ST3, $\lambda_C$ is determined such as to attain the single mode in the wavelength band for use without increasing the bending loss. At step ST4, the relative refractive index difference $\Delta^+$ of the core 110 with respect to the inner cladding 120 and the diameter $2a$ of the core 110 are determined such as to yield thus determined $A_{eff}$ and $\lambda_C$.

At step ST5, on the other hand, $\lambda_C$ is determined such that $\lambda_{LK}$ is longer than the wavelength band for use in FIG. 3. At step ST6, a target bending loss is determined. At step ST7, the relative refractive index difference $\Delta^-$ of the inner cladding 120 with respect to the outer cladding 130 and the ratio $2b/2a$ are determined from FIG. 4 such as to yield $A_{eff}$ and $\lambda_C$ determined as in the foregoing. At step ST8, the primary coating resin 141 and secondary coating resin 142 are determined such as to suppress the micro-bending loss to a low level.

Figure 9A:
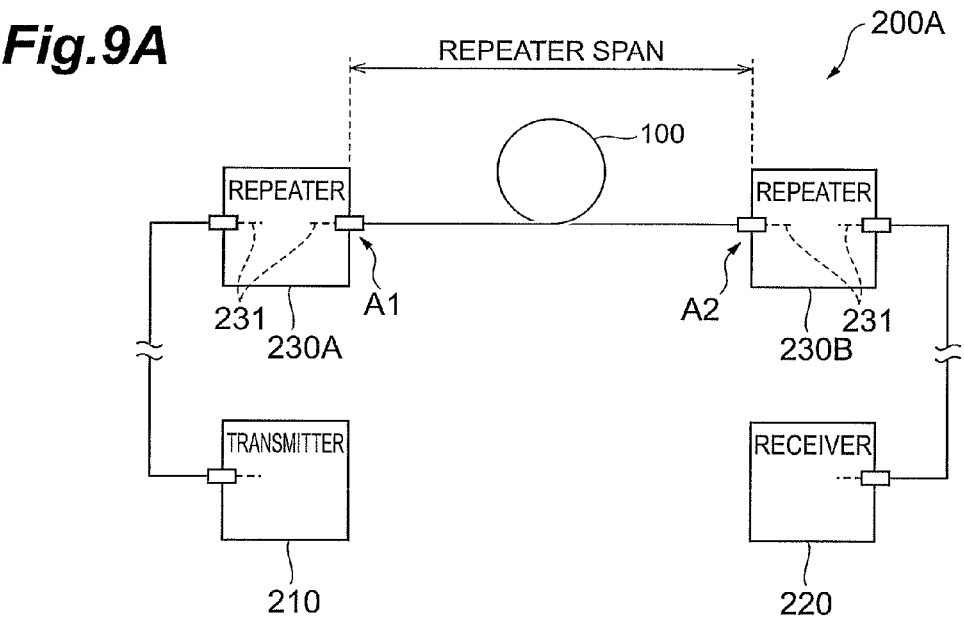
FIGS. 9A and 9B are views showing the structures of respective embodiments of the optical communication system according to the present invention.
Figure 9B:
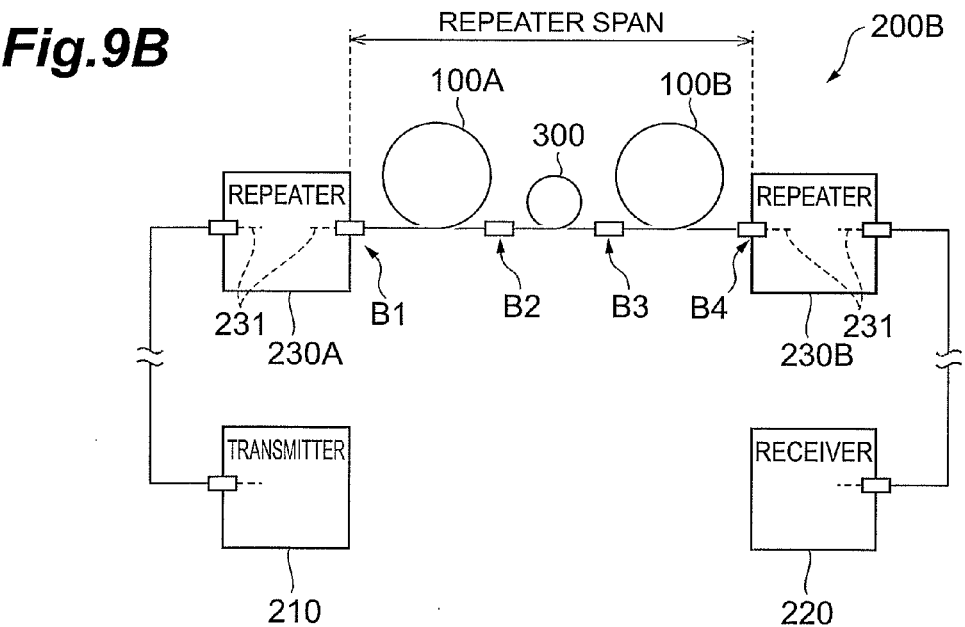

FIGS. 9A and 9B are views showing the structures of respective embodiments of the optical communication system according to the present invention. FIG. 9A shows the structure of an optical transmission system in which two connections with the SMF exist in one repeater span. FIG. 9B shows the structure of an optical transmission system in which four connections with the SMF exist in one repeater span.

In particular, the optical communication system 200A shown in FIG. 9A comprises a transmitter 210 for outputting signal light 210 and a receiver 220 for receiving the signal light, while a plurality of repeaters 230A, 230B are arranged on a transmission line between the transmitter 210 and receiver 220. The repeater span is the optical transmission section between the repeaters 230A, 230B and includes a single transmission optical fiber 100 (the optical fiber according to the present embodiment) in the optical communication system 200A. Both ends of the transmission optical fiber 100 are connected to other kinds of transmission optical fibers (not shown) at end parts of the repeaters 230A, 230B, respectively, whereby two connections A1, A2 exist in one repeater span in the optical communication system 200A of FIG. 9A.

On the other hand, the optical communication system 200B shown in FIG. 9B comprises a transmitter 210 for outputting signal light 210 and a receiver 220 for receiving the signal light, while a plurality of repeaters 230A, 230B are arranged on a transmission line between the transmitter 210 and receiver 220. The repeater span is the optical transmission section between the repeaters 230A, 230B and includes two transmission optical fibers 100 (each of which is the optical fiber according to the present embodiment) and another kind of transmission optical fiber 300 in the optical communication system 200B. The repeater span has four connections B1 to B4 including the connections B1, B4 with the end parts of the repeaters 230A, 230B. That is, four connections B1 to B4 exist in one repeater span in the optical communication system 200B of FIG. 9B.

In each of the optical communication systems 200A, 200B, each of optical fibers 231 at both ends of the repeaters 230A, 230B is a standard SMF but sometimes has an effective area $A_{eff}$ of 85 µm² which is greater than a typical effective area $A_{eff}$ of 80 µm². The other kind of transmission optical fiber 300 has an effective area $A_{eff}$ smaller than that of the standard SMF (e.g., 85 µm²).

As described above, the present invention can improve the OSNR in an optical communication system performing Raman amplification, while making it possible to prevent the fundamental-mode cutoff from causing the leakage loss and suppress the bending loss at the same time. That is, the optical communication system as a whole is less susceptible to the increase in dispersion value of the optical fiber itself, which is an optical transmission line, as the optical receiver improves its performances, whereby the optical fiber according to the present invention specialized in improving the OSNR and suppressing the bending loss without aiming to improve the dispersion value is useful.

What is claimed is:

1. A silica-based optical fiber having a transmission loss of 0.19 dB/km or less at a wavelength of 1550 nm, an effective area $A_{eff}$ of 120 μm$^2$ or more but 150 μm$^2$ or less at the wavelength of 1550 nm, and a fiber cutoff wavelength $\lambda_C$ of 1.3 μm or more but 1.53 μm or less, the optical fiber comprising:
   a) a core comprised of pure silica, the core having a refractive index $n_1$ and a diameter 2a;
   b) an inner cladding, provided at an outer periphery of the core, having a refractive index $n_2$ and a diameter 2b; and
   c) an outer cladding, provided at an outer periphery of the inner cladding, having a refractive index $n_3$,
   d) wherein the refractive index $n_3$ is smaller than the refractive index $n_1$ but greater than the refractive index $n_2$,
   e) wherein the ratio Ra(=2b/2a) of the diameter of the inner cladding to the diameter of the core is 2.5 or more but 3.5 or less,
   f) wherein the core has the diameter of 12.9 μm or more but 15.0 μm or less,
   g) wherein the relative refractive index difference $\Delta^*(=100\times(n_1-n_2)/n_2)$ of the core with the inner cladding of 0.265% or more but 0.345% or less,
   h) wherein, letting $\lambda_{FCup}$ be the fundamental-mode cutoff wavelength when a fundamental mode begins to leak at 1625 nm, a fundamental-mode cutoff wavelength $\lambda_{FC}$ is set to a wavelength exceeding $\lambda_{FCup}$, and
   i) wherein the relative refractive index difference $\Delta^-(=100\times(n_2-n_3)/n_3)$ of the inner cladding with respect to the outer cladding at which the bending loss is minimized is −0.12% or more but −0.06% or less.

2. The optical fiber according to claim 1, wherein the effective area $A_{eff}$ at the wavelength of 1550 nm is 140 μm$^2$ or less.

3. The optical fiber according to claim 1, wherein the fundamental-mode cutoff wavelength $\lambda_{FC}$ exceeds 2400 nm.

4. The optical fiber according to claim 2, wherein propagating light is Raman-amplified in the optical fiber.

5. The optical fiber according to claim 4, wherein the optical fiber has a fiber cutoff wavelength of 1.45 μm or less.

6. An optical communication system, comprising:
   a plurality of first optical fibers disposed at two or more locations in a repeater span of 80 km or more, each of the first optical fibers having the structure of the optical fiber according to claim 5;
   a plurality of second optical fibers connected to the first optical fibers at four or more locations in the repeater span including both ends thereof, each of the second optical fibers having an effective area $A_{eff}$ of 85 μm$^2$ or less at a wavelength of 1550 nm, the second optical fibers including those disposed at both ends of the repeater span and at one location in the repeater span.

7. An optical communication system, comprising:
   a plurality of first optical fibers disposed at two or more locations in a repeater span of 80 km or more;
   a plurality of second optical fibers connected to the first optical fibers at four or more locations in the repeater span including both ends thereof, each of the second optical fibers having an effective area $A_{eff}$ of 85 μm$^2$ or less at a wavelength of 1550 nm, the second optical fibers including those disposed at both ends of the repeater span and at one location in the repeater span,
   wherein each of the first optical fibers has a transmission loss of 0.19 dB/km or less at the wavelength of 1550 nm, an effective area $A_{eff}$ of 110 μm$^2$ or more but 150 μm$^2$ or less at the wavelength of 1550 nm, and a fiber cutoff wavelength $\lambda_C$ of 1.3 μm or more but 1.45 μm or less, and
   wherein propagating light is Raman-amplified in each of the first optical fibers.

8. The optical communication system according to claim 7, wherein each of the first optical fibers comprises: a core comprised of pure silica, the core having a refractive index $n_1$ and a diameter 2a; an inner cladding, provided at an outer periphery of the core, having a refractive index $n_2$ and a diameter 2b; and an outer cladding, provided at an outer periphery of the inner cladding, having a refractive index $n_3$,
   wherein the refractive index $n_3$ is smaller than the refractive index $n_1$ but greater than the refractive index $n_2$,
   wherein the ratio Ra(=2b/2a) of the diameter of the inner cladding to the diameter of the core is 2.5 or more but 3.5 or less,
   wherein, letting $\lambda_{FCup}$ be the fundamental-mode cutoff wavelength when a fundamental mode begins to leak at the upper limit of the wavelength for use, a fundamental-mode cutoff wavelength $\lambda_{FC}$ is set to a wavelength exceeding $\lambda_{FCup}$, and
   wherein, letting $\Delta^-_{min}$ be the relative refractive index difference $\Delta^-(=100\times(n_2-n_3)/n_3)$ of the inner cladding with respect to the outer cladding at which the bending loss at the wavelength for use is minimized, $\Delta^-$ is designed such as to become $\Delta^-_{min}$ or more but ($\Delta^-_{min}$+0.06) % or less.

9. The optical communication system according to claim 7, wherein each of the first optical fibers is a medium for propagating light with a wavelength of 1625 nm or less and comprises: a core comprised of pure silica, the core having a refractive index $n_1$ and a diameter 2a; an inner cladding, provided at an outer periphery of the core, having a refractive index $n_2$ and a diameter 2b; and an outer cladding, provided at an outer periphery of the inner cladding, having a refractive index $n_3$,
   wherein the refractive index $n_3$ is smaller than the refractive index $n_1$ but greater than the refractive index $n_2$,
   wherein the relative refractive index difference $\Delta^-(=100\times(n_2-n_3)/n_3)$ of the inner cladding with respect to the outer cladding is −0.12% or more but −0.06% or less, and
   wherein the ratio Ra(=2b/2a) of the diameter of the inner cladding to the diameter of the core is 2.5 or more but 3.5 or less.

10. The optical communication system according to claim 7, wherein the effective area $A_{eff}$ is 120 μm$^2$ or more but 140 μm$^2$ or less.

11. An optical communication system comprising the optical fiber according to claim 1 as a transmission line in a repeater span,
   wherein light signals are received by a digital coherent receiver, and waveform distortions of the received signals caused by dispersions are compensated for by a digital coherent signal processor in the digital coherent receiver.

12. An optical communication system comprising the optical fiber according to claim 2 as a transmission line in a repeater span,
   wherein light signals are received by a digital coherent receiver, and waveform distortions of the received signals caused by dispersions are compensated for by a digital coherent signal processor in the digital coherent receiver.

13. An optical communication system, comprising:
a first optical fiber having the structure of the optical fiber according to claim 5 and disposed in a repeater span;
two second optical fibers disposed, in the repeater span, at both ends of the repeater span and connected to the first optical fiber, each of the second optical fibers having an effective area $A_{\mathit{eff}}$ of 85 μm² or less at a wavelength of 1550 nm; and
a receiver compensating for wavefront distortions of the received signals caused by dispersions by a digital coherent signal processing technology.

\* \* \* \* \*